United States Patent Office 3,167,534
Patented Jan. 26, 1965

3,167,534
PROCESS FOR THE POLYMERIZATION OF VINYL-CHLORIDE WITH A CATALYST MIXTURE OF TRIALKYL ALUMINUM AND BORIC ACID-TRI-ALKYL ESTER
Robert Büning, Troisdorf, Bezirk Cologne, Germany, assignor to Dynamit Nobel Aktiengesellschaft, Troisdorf, Bezirk Cologne, Germany, a corporation of Germany
No Drawing. Filed Sept. 25, 1961, Ser. No. 140,208
Claims priority, application Germany Oct. 14, 1960
21 Claims. (Cl. 260—92.8)

The present invention relates to the polymerization of vinylchloride and more particularly to such polymerization carried out in the presence of a catalyst mixture of an organo-aluminum compound and a boric acid ester.

The polymerization of vinylchloride with organo-metallic compounds as polymerization catalysts, in the conventional manner, leads to the formation of polymerizates which have better structural stability at higher temperatures than polymerizates which are produced according to conventional methods in the absence of organo-metallic catalysts. A variety of organo-metallic compounds has been proposed as polymerization catalysts for polymerizing vinylchloride. Among the organo-metallic compounds, organo-aluminum compounds have found wide application since they are easily obtained and show particular advantages in industrial applications.

It is an object of the present invention to provide a process for the polymerization of vinylchlorides in the presence of a catalyst mixture of an organo-aluminum compound and a boric acid ester, so as to obtain a better space-time-yield as opposed to the catalytic polymerization of vinylchloride heretofore carried out.

Other and further objects of the invention will become apparent from a study of the within specification and accompanying examples.

It has been found in accordance with the present invention that an effective process for the polymerization of vinylchloride may be provided having a better space-time-yield as compared with the catalytic polymerization of vinylchloride carried out with organo-aluminum compounds alone. Significantly, the present invention contemplates the carrying out of the polymerization of vinyl-chloride in the presence of a catalyst mixture of an or-gano-aluminum compound together with a boric acid ester, and recovering from the resulting reaction product the polymerizate formed.

Preferably, the process is carried out in the additional presence of an oxidation agent such as sulfur, nitrogen-tetroxide, nitrogen-dioxide, halogens, such as bromine, iodine, chlorine, and fluorine, and similar compounds. The molar ratio of oxidation agent to organo-aluminum compound should be smaller than 1 and preferably is smaller than 0.1, i.e., a molar ratio of 0.1:1.

Where the oxidation agent is sulfur, preferably, the sulfur is admixed with the organo-aluminum compound prior to the admixing of the boric acid ester therewith. In this manner, advantageously, the sulfur will be dissolved more readily, as, for example in a solvent medium used for the catalyst mixture to be prepared. On the other hand, the nitrogen tetroxide, nitrogen dioxide, halogen, or similar compounds which may be used as oxidation agents may be merely added to the vinylchloride prior to polymerization.

The catalyst mixture may be prepared in accordance with the invention by admixing the organo-aluminum compound and the boric acid ester, optionally with the addition of a solvent for the mixture. Such mixture is treated by heating, preferably at a temperature between about 40 and 70 degrees C., although the use of higher temperature is also possible. It should be noted that the mixing most preferably takes places under the exclusion of water and oxygen for best results.

The solvents which may be used for dissolving the organo-aluminum compound and the boric acid ester may be any suitable solvent, such as aliphatic hydrocarbons, aromatic hydrocarbons, normal ethers, and cyclic ethers, such as tetrahydrofuran, dioxan, etc.

The organo-aluminum compounds which may be used in accordance with the invention include aluminum trialkyl compounds, such as aluminum trimethyl, aluminum triethyl, aluminum tripropyl, aluminum tributyl, aluminum triisobutyl, etc.

The boric acid ester contemplated by the present invention includes preferably boric acid trialkyl esters, such as the trimethyl ester, triethyl ester, tripropyl ester, tributyl ester, triisobutyl ester, triallylester, triisooctylester, and the like, and mixtures thereof.

The polymerization is advantageously carried out at a temperature between about minus 30 degrees C. and the boiling point of vinylchloride. By reason of the presence of the catalyst mixture in accordance with the invention, the components of which are economically easily accessible, a better space-time-yield may be achieved as against the catalytic polymerization of vinyl chloride as carried out only with organo-aluminum compound. Due to the presence of the particular catalyst mixture of the invention, the polymerization of vinylchloride may be carried out without pressure. Significantly, the polymerizates produced in this manner may be processed to molded bodies or articles of all kinds as well as to foils, films and the like. It will be appreciated that the presence of suitable oxidation agents, as mentioned hereinabove, cause the polymerization reaction to be still further accelerated. These oxidation agents are generally those which do not inactivate the organo-aluminum compounds. This is especially true where the molar ratio of the oxidation agent to the organo-aluminum compound is smaller than 1 and preferably smaller than 0.1, since otherwise the polymerization may be negatively influenced. On the other hand, the molar ratio of organo-aluminum compound to boric acid ester may be varied within wide limits, i.e. 4:0,5 to 0.25–8:1.

The following examples are set forth for the purpose of illustrating the present invention, and it is to be understood that the invention is not to be limited thereby.

*Example 1*

In a one-liter reaction vessel, which is cooled to —20 degrees C., 700 grams of dried vinylchloride (preferably dried over molecular sieves, such as zeolite), containing 20 mg. of nitrogen-tetroxide, are introduced under the exclusion of air and moisture. As polymerization catalyst for the vinylchloride, a mixture of aluminum-triethyl and boric acid trimethyl ester is used. The catalyst mixture is prepared by combining 2.5 grams of aluminum triethyl and 5 grams of boric acid trimethyl ester in 50 cc. of tetrahydrofuran and heating at 65 degrees C. for a period of 15 minutes. The catalyst mixture prepared in this manner is added to the vinylchloride and the reaction is effected. An hour after the addition of the catalyst mixture to the vinylchloride, the polymerizate formed is centrifuged to remove the liquid portions of the reaction mixture, thereafter washed with liquid vinylchloride and dried. The yield of polymerizate amounts to 173 grams.

Under analogous conditions, where the foregoing procedure is carried out using only aluminum triethyl as catalyst for the polymerization, instead of the catalyst mixture in accordance with the invention, a yield is obtained of only 28 grams.

*Example 2*

Into a carefully dried reaction vessel (40 liters content), 25 kg. of liquid vinylchloride (well dried) are introduced. The reaction vessel is cooled with cooling brine to a temperature of minus 20 degrees C. The vessel is provided with a T-stirrer, which is rotated at 30 revolutions per minute. As polymerization catalyst a reaction mixture is used prepared in accordance with the following procedure:

80 grams of aluminum triethyl in 250 cc. of tetrahydrofuran are treated with 0.18 gram of sulfur and shaken up until the sulfur has gone into solution, whereupon the solution is treated with 120 grams of boric acid triethyl ester and heated for a period of 10 minutes to 60 degrees C. The preparation of the catalyst is carried out under the exclusion of air and moisture. The catalyst formed in the foregoing manner is introduced into the reaction vessel containing the liquid vinylchloride and after only 15 minutes, the temperature rises in the reaction vessel to the boiling point of the vinylchloride. The polymerization is continued at this temperature since by the boiling of the vinylchloride, the heat of polymerization is carried off in a conveniently simple manner. After 1.5 hours, the polymerizate is separated from monomers and unconsumed catalyst by centrifuging. The polymerizate obtained in this manner is washed with liquid vinyl chloride and then dried. The yield amounts to 5.6 kg. of polymerizate.

*Example 3*

In accordance with the procedure set forth in the foregoing example, 200 grams of vinylchloride are treated with 5 mg. of bromine and polymerized at a temperature of minus 16 degrees C. with a catalyst mixture prepared in accordance with the following procedure:

1.0 gram of aluminum tributyl is dissolved in 20 cc. of dioxan, then mixed with 3.4 grams of boric acid triallylester and heated to 45 degrees C. for a period of 10 minutes. Upon adding the so prepared catalyst mixture to the vinyl chloride and bromine, polymerization is carried out for a period of 2 hours and thereupon the polymerizate is isolated. The yield amounts to 83 grams of polymerizate.

*Example 4*

Into 8 grams of boric acid triisooctylester are dissolved 2.0 grams of aluminum triethyl. This solution is treated with 3 grams of boric acid trimethylester. The reaction mixture obtained in this way is used as polymerization catalyst for the polymerization of 0.7 kg. of vinylchloride to which 20 mg. of iodine have been added. The polymerization temperature amounts to −30 degrees C. and the polymerization time is 2 hours. The yield of polymerizate amounts to 167 grams.

*Example 5*

Into a pressure autoclave of 500 cc. content, 200 grams of vinylchloride are introduced under pressure as well as a solution having the following composition: 25 cc. of dioxan, 1.5 grams of aluminum triisobutyl and 4.2 grams of boric acid triisobutylester. The polymerization, unlike that carried out in the foregoing examples, is carried out without any oxidation agent. A temperature of plus 10 degrees C. is employed in this instance. The polymerization time amounts to 1.5 hours and a white polymerizate is obtained which may be pressed at 160 degrees C. to form transparent plates without the addition of a stabilizer, said plates being only slightly colored if at all. The yield amounts to 64 grams.

All operations in the examples are carried out in a nitrogen atmosphere. The solvent for the catalyst mixture, such as tetrahydrofuran and dioxan, can be substituted by diethyl ether, petroleum ether, n-hexane, and the like.

What is claimed is:

1. Process for the polymerization of vinylchloride which comprises effecting the polymerization of vinylchloride in the presence of a catalyst mixture of an aluminum-trialkyl compound and a boric acid-trialkyl ester, and recovering the polymerizate formed from the reaction product.

2. Process according to claim 1 wherein said polymerization is carried out at a temperature between about −30° C. and the boiling point of vinyl chloride, the molar ratio of the aluminum-trialkyl compound to the boric acid-trialkyl ester being between about 0.25–8:1.

3. Process according to claim 2 wherein the catalyst mixture is present in a solvent therefor.

4. Process according to claim 3 wherein said solvent is selected from the group consisting of aliphatic hydrocarbons, aromatic hydrocarbons, normal ethers, and cyclic ethers, and said polymerization is carried out in a nitrogen atmosphere.

5. Process according to claim 4 wherein said catalyst mixture is prepared by combining the aluminum-trialkyl compound and the boric acid-trialkyl ester and heating at a temperature between about 40–70° C., under the exclusion of moisture and oxygen.

6. Process according to claim 4 wherein the catalyst mixture is present in tetrahydrofuran as solvent.

7. Process according to claim 4 wherein the catalyst mixture is present in dioxan as solvent.

8. Process according to claim 2 wherein the aluminum-trialkyl compound is aluminum-triethyl.

9. Process according to claim 2 wherein the boric acid-trialkylester is boric acid-triethyl ester.

10. Process according to claim 2 wherein the boric acid-trialkyl ester is a mixture of boric acid-trimethyl ester and boric acid-triisooctyl ester.

11. Process for the polymerization of vinyl chloride which comprises effecting the polymerization of vinyl chloride in the presence of a catalyst mixture of an aluminum-trialkyl compound and a boric acid-trialkyl ester, and an oxidation agent selected from the group consisting of sulfur, nitrogen tetroxide, nitrogen dioxide, and a free halogen, and recovering the polymerizate formed from the reaction product.

12. Process according to claim 11 wherein said polymerization is carried out at a temperature between about −30° C. and the boiling point of vinyl chloride, the molar ratio of the aluminum-trialkyl compound to the boric acid-trialkylester being between about 0.25–8:1, and the molar ratio of the oxidation agent to the aluminum-trialkyl compound being a positive value smaller than 1.

13. Process according to claim 12 wherein the catalyst mixture is present in a solvent therefor.

14. Process according to claim 13 wherein said solvent is selected from the group consisting of aliphatic hydrocarbons, aromatic hydrocarbons, normal ethers, and cyclic ethers, and the molar ratio of the oxidation agent to the aluminum-trialkyl compound is a positive value smaller than 0.1:1, and the polymerization is effected in a nitrogen atmosphere.

15. Process according to claim 14 wherein said catalyst mixture is prepared by combining the aluminum-trialkyl compound and the boric acid-trialkyl ester and heating at a temperature between about 40–70° C., under the exclusion of moisture and oxygen.

16. Process according to claim 15 wherein the oxidation agent is sulfur and the sulfur is admixed with the aluminum-trialkyl compound prior to the admixing of the boric acid-trialkyl ester therewith.

17. Process according to claim 14 wherein the catalyst mixture is present in tetrahydrofuran as solvent.

18. Process according to claim 14 wherein the catalyst mixture is present in dioxan as solvent.

19. Process according to claim 12 wherein the aluminum-trialkyl compound is aluminum-triethyl.

20. Process according to claim 11 wherein the boric acid-trialkyl ester is boric acid-triethyl ester.

21. Process according to claim 12 wherein the boric acid-trialkyl ester is a mixture of boric acid-trimethyl ester and boric acid-triisooctyl ester.

References Cited in the file of this patent
FOREIGN PATENTS
566,532   Belgium _____ Oct. 6, 1958

OTHER REFERENCES
Kawai et al.: J. Chem. Soc. Japan, 80, pp. 776–9, 1959. (See Chem. Abs., v. 55, p. 3111g–i.)
Ashikari: J. Poly. Sci., 28, pp. 641–2, 1958.